(12) United States Patent
Seo (10) Patent No.: US 7,641,393 B2
(45) Date of Patent: Jan. 5, 2010

(54) HUB UNIT MOUNTING STRUCTURE

(75) Inventor: Nobuyuki Seo, Toyonke (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 460 days.

(21) Appl. No.: 11/730,046

(22) Filed: Mar. 29, 2007

(65) Prior Publication Data

US 2007/0230850 A1     Oct. 4, 2007

(30) Foreign Application Priority Data

Mar. 30, 2006    (JP)   ............................ P2006-095976

(51) Int. Cl.
*F16C 13/00*     (2006.01)
(52) U.S. Cl. ...................... 384/544; 384/589
(58) Field of Classification Search ................ 384/544, 384/589, 462; 301/105.1
See application file for complete search history.

(56) References Cited

U.S. PATENT DOCUMENTS 5,100,247 A * 3/1992 Woehler ..................... 384/544

2007/0098315 A1 * 5/2007 Komori et al. .............. 384/544

FOREIGN PATENT DOCUMENTS

| JP | 2000110840 A | * | 4/2000 |
| JP | 2000-142015 | | 5/2000 |
| JP | 2002-029209 | | 1/2002 |
| JP | 2005-075067 | | 3/2005 |

* cited by examiner

*Primary Examiner*—Thomas R Hannon
(74) *Attorney, Agent, or Firm*—McGinn IP Law Group, PLLC (57) ABSTRACT

A hub unit is fixed to a body's side in such a state that a lubricating ring member is held between a hub receiving surface which constitutes a step portion of a large-diameter portion and a vehicle inner side end face of an inner ring with at least either of an abutment surface of the lubricating ring member with the hub receiving surface and an abutment surface thereof with the vehicle inner end face of the inner ring made to constitute a lubricant holding surface which holds a lubricant, whereby the hub receiving surface and the vehicle inner side end face of the inner ring are made to easily slip relative to each other, thereby making it possible to prevent the generation of an abnormal noise between contact surfaces of the inner ring and the hub receiving surface of the axle.

6 Claims, 7 Drawing Sheets

HUB UNIT MOUNTING STRUCTURE

BACKGROUND OF THE INVENTION

1. Field of the Invention

The present invention relates to a hub unit mounting structure.

2. Related Art

A drive wheel supporting rolling bearing device is configured such that an axle (a drive shaft) is spline fitted in a central shaft hole in a hub wheel from an inner side of a vehicle, so that the axle and the hub wheel rotate together.

To describe specifically, the axle is formed diametrically large at a body portion and diametrically small at a distal end side thereof, and a spline is formed on a root side of the small-diameter portion of the axle, while a threaded portion is formed on the distal end side thereof, whereby a hub receiving surface of a vehicle outer side end face of the large-diameter portion of the axle is brought into abutment with a vehicle inner side end face of an inner ring by spline fitting the axle in the shaft hole in the hub wheel. Then, a nut is screwed on the threaded portion at the distal end of the axle so as to be pressed against a vehicle outer side end portion of the hub wheel, so that the hub wheel and the inner ring are held axially by the nut so screwed and the hub receiving surface, whereby the hub wheel, the axle and the inner ring are integrated together.

By the configuration that has been described above, normally, the axle, the hub wheel and the inner ring rotate together as an integrated unit. In conditions where a vehicle is drastically started or turned, however, the axle is twisted and a slip occurs between contact surfaces of the inner ring and the end face of the large-diameter portion of the axle, whereby a stick-slip noise (a so-called clink noise) is generated.

As a countermeasure against this, the tightening force of the nut is increased to increase, in turn, the frictional force at the vehicle inner side end face of the inner ring so that no slip is generated between the contact surfaces of the inner ring and the end face of the large-diameter portion of the axle. Alternatively, a lubricant is applied to the vehicle inner side end face of the inner ring to thereby, on the contrary, decrease the frictional force between the contact surfaces so as to release the twist generated in the axle on an early occasion.

Furthermore, according to JP-A-2005-75067, in order to effectively prevent the generation of the stick-slip noise, by bringing a non-wheel side of a connecting portion of an axle where the axle connects to a hub wheel nearer to an abutment spot between an end face side of an inner ring and a large-diameter portion of the axle, a difference in torsional rigidity of the axle between the abutment sport and a connecting spot on the non-wheel side of the connecting portion is made small.

When the tightening force of the nut is increased, however, there has been caused a problem with the strength of the threads, and with the application of the lubricant, there has been caused a problem that the effect of the lubricant does not last long. In addition, with JP-A-2005-75067, a change in structure of both the hub unit and the axle is entrained.

SUMMARY OF THE INVENTION

A problem that the invention is to solve is to provide a hub unit mounting structure which prevents the generation of an abnormal noise (the stick-slip noise) between the contact surfaces of the inner ring and the end face of the large-diameter portion of the axle.

With a view to solving the problem, according to the invention, there is provided a mounting structure of mounting a hub unit on an axle of a vehicle, comprising:

the axle including;
a hub mounting portion formed at an axially distal end portion thereof, and
a large-diameter portion continuous to the hub mounting portion through a step portion therebetween having a larger outside diameter than an outside diameter of the hub mounting portion; and
the hub unit mounted on the hub mounting portion of the axle, including:
an outer ring which is stationarily mounted on a vehicle body,
a hub wheel having a shaft hole disposed concentrically with the outer ring and attached to a wheel so as to rotate together with the wheel,
an inner ring which is securely fitted around at least a vehicle inner side end portion of the hub wheel, and
a plurality of rows of rolling elements interposed between the inner ring fitted around the hub wheel and the outer ring,
wherein the hub mounting portion of the axle is inserted into the shaft hole in the hub wheel from a vehicle inner side so that the hub unit is fixed to the vehicle body,
wherein a lubricating ring member is held between a hub receiving surface on the step portion of the axle and a vehicle inner side end face of the inner ring, and
the lubricating ring member includes a lubricant holding surface which holds a lubricant on at least one of an abutment surface thereof to the hub receiving surface and an abutment surface thereof to the vehicle inner end face of the inner ring.

According to the above configuration, since the hub unit is fixed to the vehicle body such that the lubricating ring member is held between the hub receiving surface which constitutes the step portion of the large-diameter portion and the vehicle inner side end face of the inner ring, the lubricant is held on at least either of the abutment surface with the hub receiving surface and the abutment surface with the vehicle inner side end face of the inner ring, whereby the hub receiving surface and the vehicle inner side end face of the inner ring are made easy to slip, thereby making it possible to prevent the generation of an abnormal noise between the contact surfaces of the inner ring and the hub receiving surface of the axle.

The lubricating ring member can be configured so as to be formed into a disk shape which has a through hole at the center thereof and be fixed by being held between the vehicle inner side end face of the inner ring and the hub receiving surface of the axle with the axle put through the through hole. By configuring the lubricating ring member in this way, by putting the axle though the through hole, the lubricating ring member can easily be held between the hub receiving face which constitutes the step portion of the large-diameter portion and the vehicle inner side end face of the inner ring.

The lubricating ring member can be configured so as to have a depression formed on at least one end face in a radial direction thereof in such a manner as to be depressed from the end face as the lubricant holding surface. By configuring the lubricating ring member in this way, the lubricant can be held in the depression. To describe more specifically, the depression can be formed into, for example, a spherical shape. Furthermore, the depression may be formed into a groove structure. By configuring the lubricating ring member in this way, since the depression can be made to hold therein a sufficient amount of lubricant, the effect of preventing the generation of an abnormal noise between the contact surfaces of the inner ring and the end face of the large-diameter portion of the axle can be made to last long.

Alternatively, the lubricating ring member can be configured as a porous sintered metal ring which is impregnated with a liquid lubricant which is held in voids thereof. Alternatively, the lubricating ring member can be configured as a composite metal sintered compact in which solid lubricating particles are dispersed in such a manner as to be exposed from the lubricant holding surface. By configuring the lubricating ring member in this way, the lubricant can be made to be held on at least either of the abutment surface with the hub receiving surface and the abutment surface with the vehicle inner side end face of the inner ring, thereby making it possible to prevent the generation of an abnormal noise between the contact surfaces of the inner ring and the hub receiving surface of the axle.

DETAILED DESCRIPTION OF THE PREFERRED EMBODIMENTS

Hereinafter, embodiments of the invention will be described by reference to the drawings.

Figure 1:
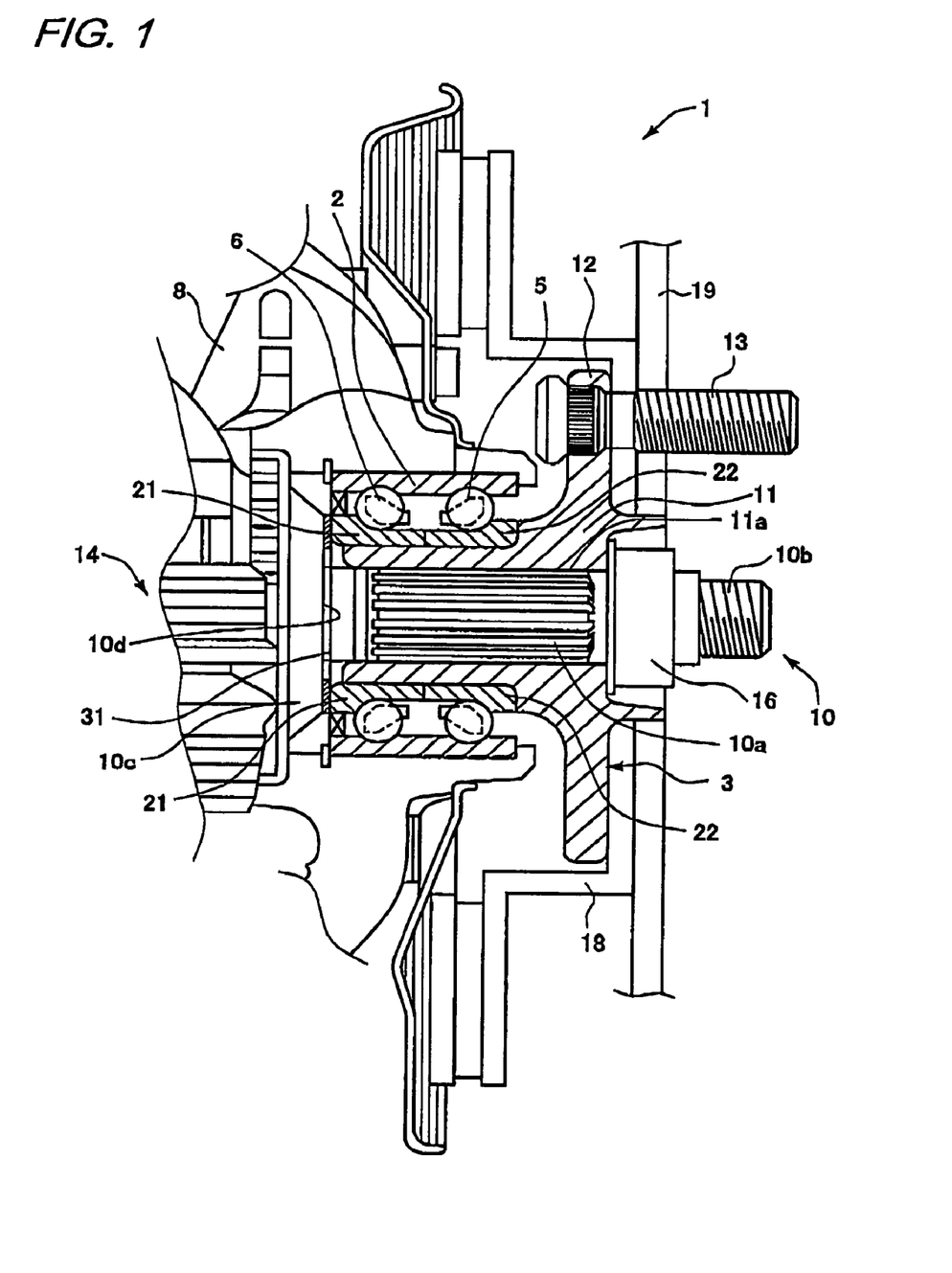
FIG. 1 is a drawing showing an embodiment of a hub unit of the invention.

FIG. 1 is a sectional view of a hub unit 1 of this embodiment. Note that in the drawing, the right is an outer side of a vehicle or body, whereas the left is an inner side of the vehicle or body. As is shown in FIG. 1, the hub unit 1 is configured to include an outer ring 2, a hub wheel 3 which is disposed concentrically with the outer ring 2, an inner ring 21, and rolling elements 5, 6.

The hub wheel 3 has a shaft portion 11 and a hub flange 12 to which a wheel 19 and a brake disc rotor 18 are fixed. The inner ring 21 is securely fitted on an outer circumferential surface of a vehicle inner side end portion of the shaft portion 11, while an inner ring 22 is securely fitted on an outer circumferential surface of a vehicle outer side of the shaft portion 11, and the rolling elements 5, 6 are arranged in double rows between the inner rings 21, 22 and the outer ring 2. The hub flange 12 is formed in such a manner as to project radially from an outer circumferential surface of a vehicle outer side end portion of the hub wheel 3.

The outer ring 2 is made of a carbon steel through hot forging, has double raceway surfaces formed on an inner circumference thereof and is fixed to a knuckle 8 on a body's side on an outer circumferential surface thereof. The hub unit 1 is fixed to the body by the outer ring 2 being fixed to the knuckle 8.

The inner ring 21 is securely fitted on the outer circumferential surface of the vehicle outer side end portion of the shaft portion 11. A vehicle inner side end face 21a of the inner ring 21 is formed further inwards in an axial direction than a vehicle inner side end face 11b (refer to FIG. 2) of the hub wheel 3.

The shaft portion 11 of the hub wheel 3 has a shaft hole 11a which passes through the shaft portion 11 in the axial direction and has on a body outer side thereof the hub flange 12 which extends radially outwards. An axle 10 is inserted in the shaft hole 11a in such a state that the axle 10 passes through the shaft hole 11a. The brake disc rotor 18 of a brake device and the wheel 19 are mounted on an outer surface of the hub flange 12 by tightening a nut (not shown) on a bolt 13 which passes through the hub flange 12.

The axle 10 is such as to be linked with a transmission shaft which transmits output rotations of a differential gear, which is disposed out of the drawing, via a constant velocity joint 14 and has a spline portion 10a on an axially halfway portion thereof. In addition, a threaded portion 10b is formed on a body outer side of the axle 10, and a large-diameter portion 10c of a larger diameter than the spline portion 10a is formed on a vehicle inner side thereof which lies at the rear of the spline portion 10a which constitutes a hub mounting portion with a step portion formed therebetween. The constant velocity joint 14 has an inner ring, balls and a cage, which are all not shown.

Figure 2:
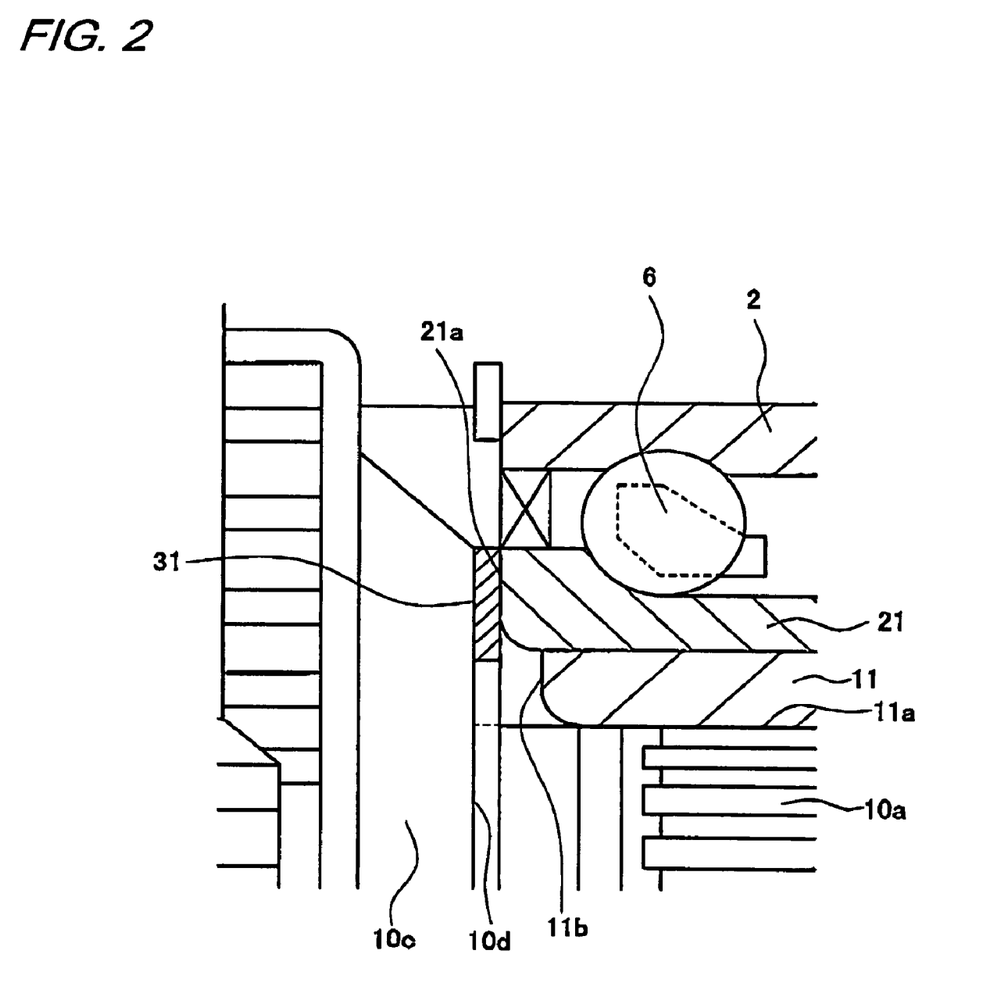
FIG. 2 is an enlarged view of a peripheral portion on which a lubricating ring member is mounted.

As is shown in FIG. 2, the hub unit 1 is mounted on a vehicle by inserting the axle 10 in the shaft hole 11a which passes through the shaft portion 11 of the hub wheel 3 in the axial direction. A nut 16 is mounted on the threaded portion 10b of the axle 10 on a vehicle inner side of the shaft hole 11a, and the nut 16 is tightened in such a state that the vehicle inner side end face 21a of the inner ring 21 abuts with the large-diameter portion 10c which is provided with the outer ring of the constant velocity joint 14 with a lubricating ring member 31 interposed therebetween on a vehicle inner side of the shaft hole 11a. A lubricant (for example, molybdenum disulfide, graphite fluoride, grease or the like) is held on the lubricating ring member 31. By this configuration, the axle 10 is connected within the shaft hole 11a of the shaft portion 11 in such a manner as not to move in the axial direction.

Namely, the vehicle inner side end face 21a of the inner ring 21 and a hub receiving surface 10d of the large-diameter portion 10c which is formed with the step portion relative to the spline portion 10a of the axle 10 are fixed to each other with the lubricating ring member 31 interposed therebetween, whereby the hub unit 1 is fixed to the vehicle. In other words, the hub mounting portion 10a of the axle 10 is inserted into the shaft hole 11a of the hub wheel 3 from the vehicle inner side, and the hub unit 1 is fixed to the vehicle body in such a state that the lubricating ring member 31 is held between the hub receiving surface 10d which makes up the step portion of the large-diameter portion 10c and the vehicle inner side end face 21a of the inner ring 21 with at least either of an abutment surface of the lubricating ring member 31 with the hub receiving surface 10d and an abutment surface thereof with the vehicle inner side end face 21a of the inner ring 21 made to constitute a lubricant holding surface which holds the lubricant.

Figure 3:
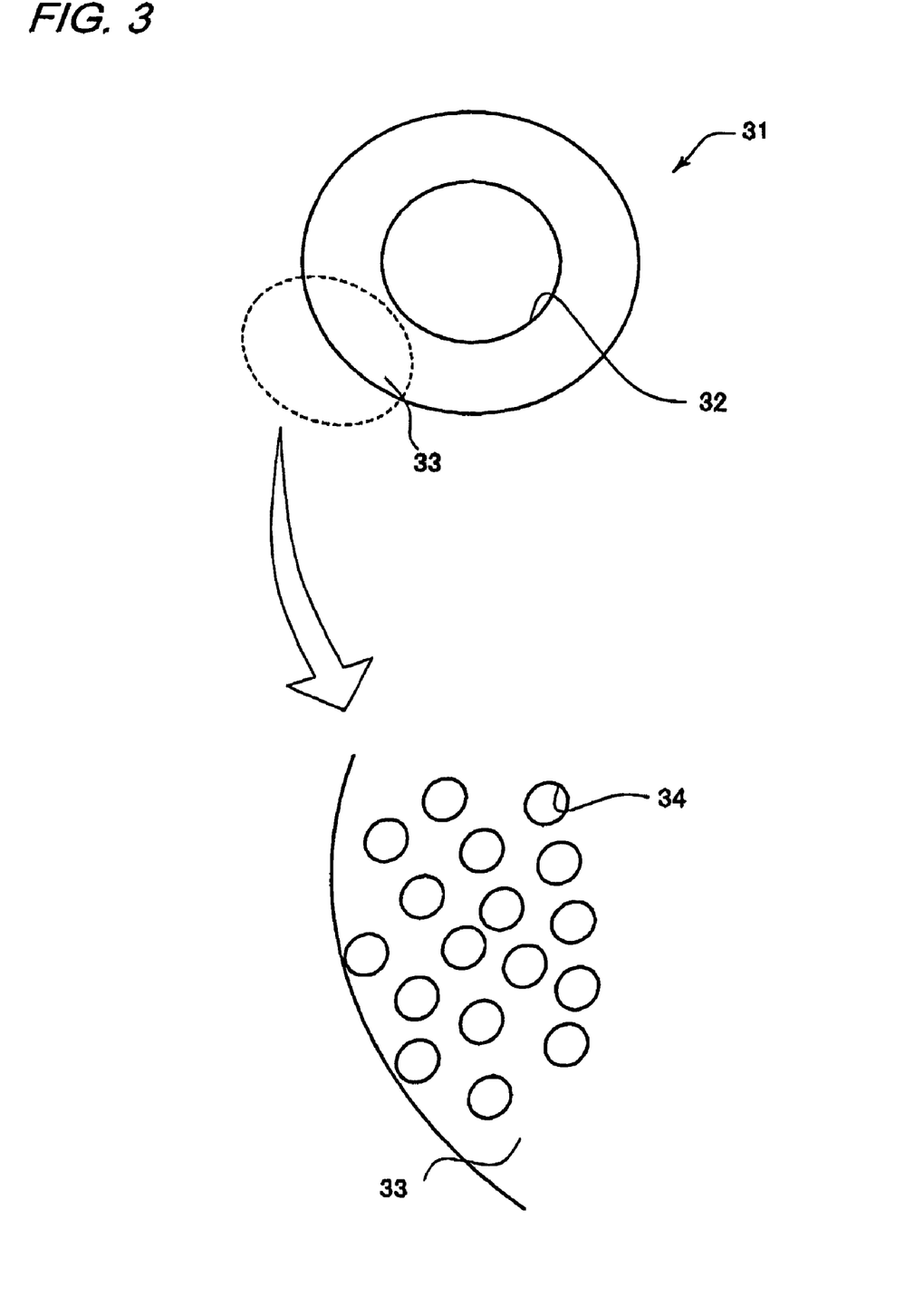
FIG. 3 is a plan view which explains Embodiment 1 of a lubricating ring member.
Figure 4:
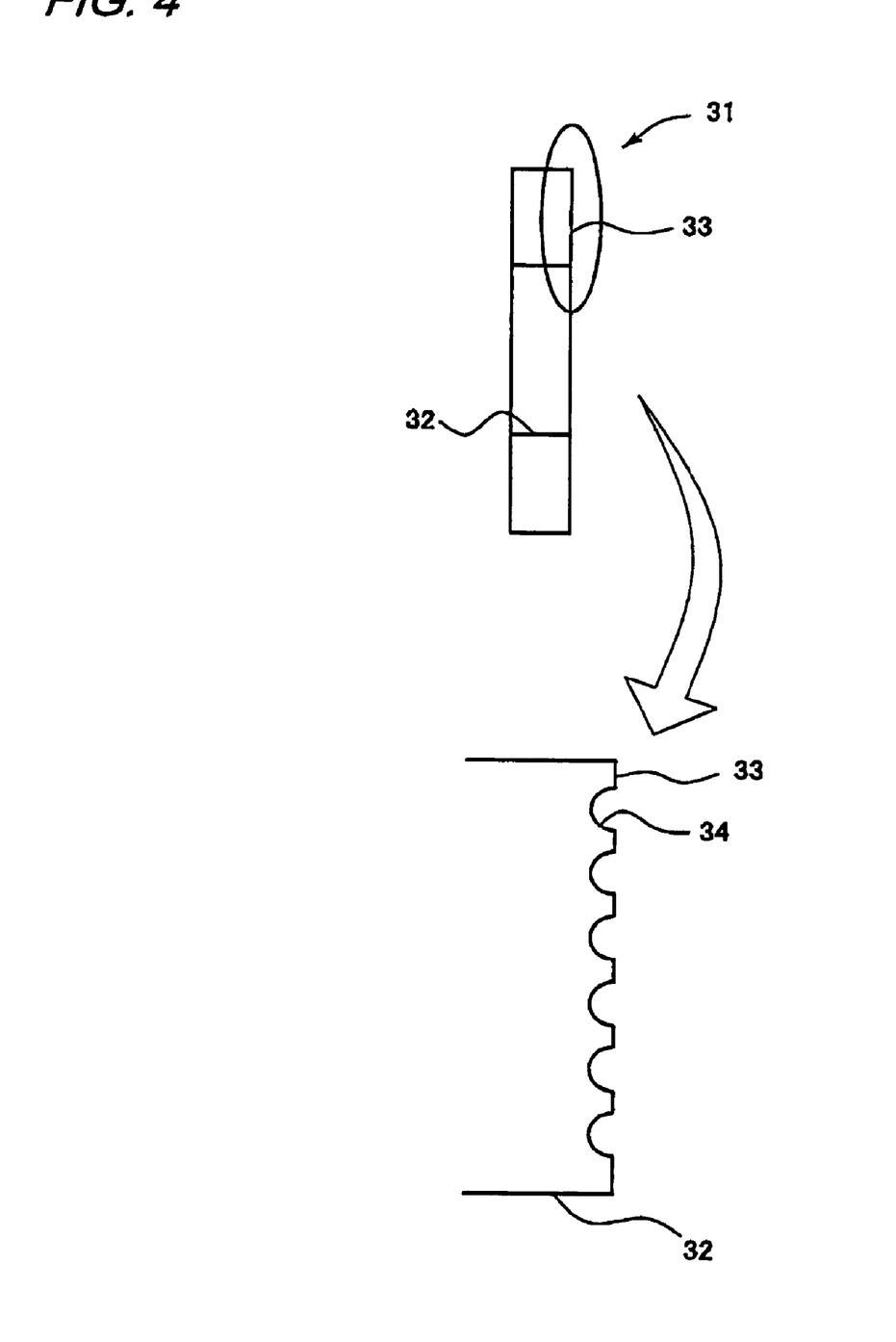
FIG. 4 is a sectional view which explains Embodiment 1 of the lubricating ring member.

FIG. 3 shows a plan view of the lubricating ring member 31 and FIG. 4 shows a side view thereof. The lubricating ring member 31 is formed into a disc shape which has a through hole 32 in the center thereof. In the lubricating ring member 31, on at least one end face 33 in a radial direction thereof, a depression 34 is formed in such a manner as to be depressed from the end face 33 so as to be made to constitute a lubricant holding surface. To describe more specifically, a plurality of spherical depressions 34 are formed, and the lubricant such as molybdenum disulfide, graphite fluoride, grease or the like is held in the depressions 34. By forming the plurality of depressions 34 in such a manner as to be dispersed over the end face 33, slippage can be made to occur easily over a wide area on the end face 33, thereby making it possible to prevent the generation of an abnormal noise between contact surfaces of the inner ring 21 and the hub receiving surface 10d of the axle 10. The depressions 34 may be formed on only the one end face 33 or may be formed on both end faces 33, 33. By forming the depressions 34 on both the end faces 33, 33, a large amount of lubricant can be held, which can facilitate further the occurrence of slippage, thereby making it possible to prevent the generation of an abnormal noise between the contact surfaces of the inner ring 21 and the hub receiving surface 10d of the axle 10.

Figure 5:
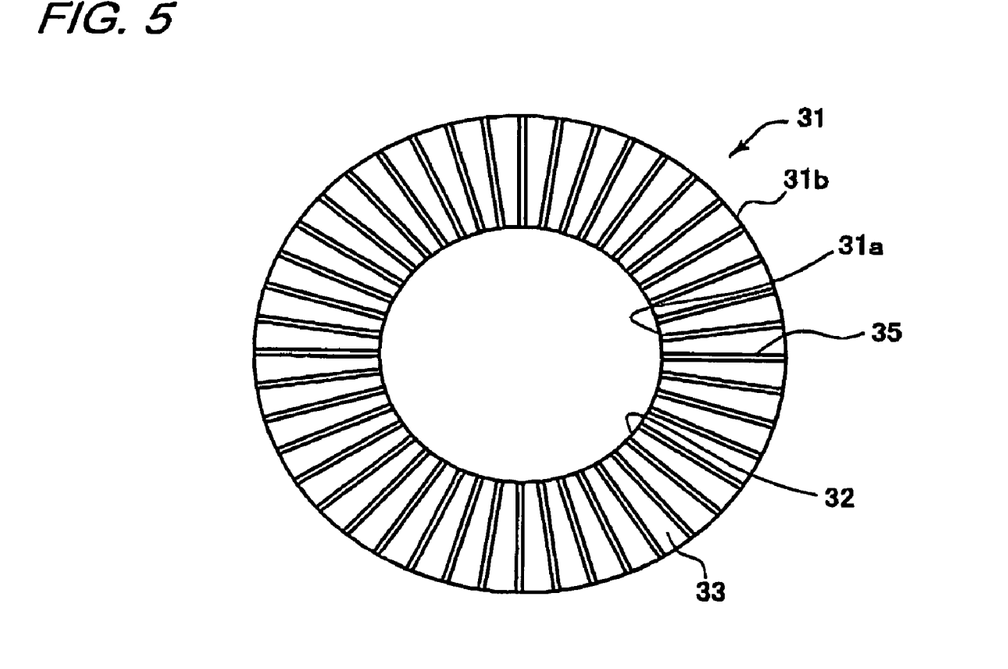
FIG. 5 is a plan view which explains Embodiment 2 of a lubricating ring member.
Figure 6:
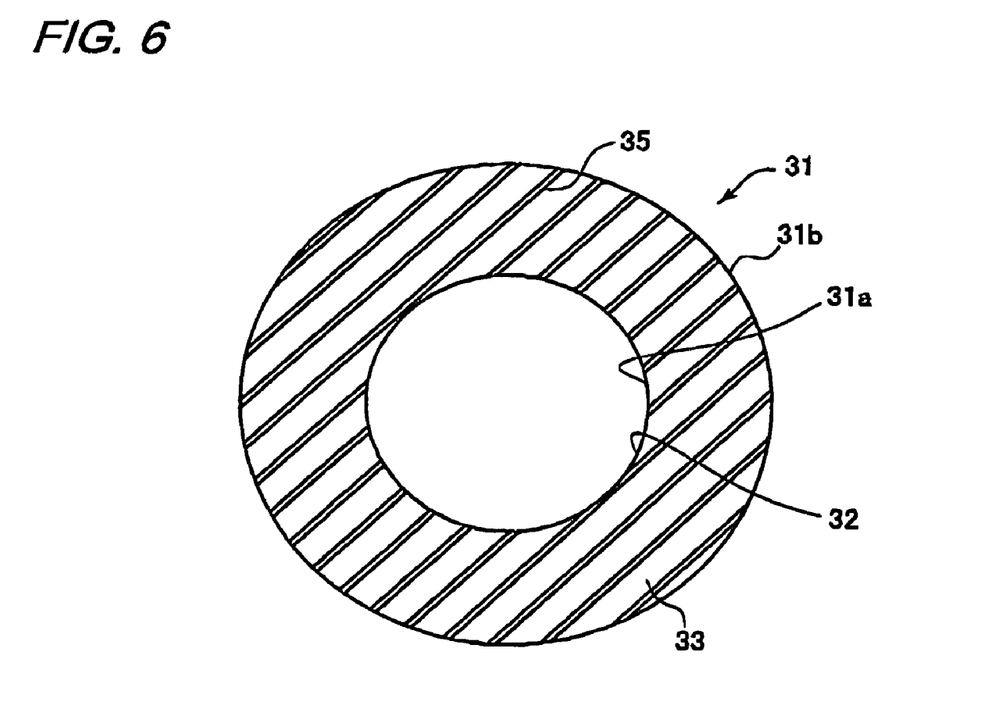
FIG. 6 is a plan view which explains Embodiment 3 of a lubricating ring member.
Figure 7:
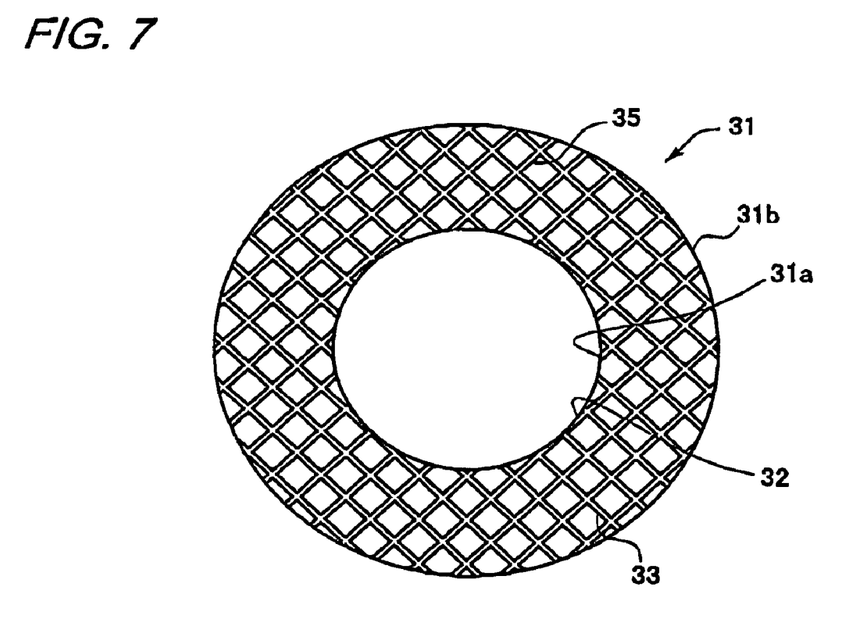
FIG. 7 is a plan view which explains Embodiment 4 of a lubricating ring member.

FIG. 5 shows another embodiment of a lubricating ring member 31. A through hole 32 is formed in a central portion of the lubricating ring member 31, and a plurality of grooves 35 are formed at constant intervals on an end face 33 in such a manner as to extend radially from an inner circumferential edge 31a lying on a through hole 32 side of the lubricating ring member 31 towards an outer circumferential edge 31b thereof. In addition, as is shown in FIG. 6, grooves 35 may be formed in such a manner as to become parallel to each other. Alternatively, as is shown in FIG. 7, grooves 35 may be formed into a mesh-like configuration. Furthermore, grooves 35 may be formed concentrically around the through hole 32.

Namely, by configuring the lubricating ring member 31 such that the depressions 34 are formed on at least the one end face 33 in the radial direction in such a manner as to be depressed from the end face 33, the end face 33 is allowed to function as the lubricant holding surface, whereby the lubricating ring member 31 and the vehicle inner side end face 21a of the inner ring 21 are made to easily slip relative to each other or the lubricating ring member 31 and the hub receiving surface 10d are made to easily slip relative to each other, thereby making it possible to prevent the generation of an abnormal noise between the contact surfaces of the inner ring 21 and the hub receiving surface 10d of the axle 10. Since the depressions 34 are made to hold the lubricant, the effect of slippage due to the lubricant can be made to last long. The depression 34 is not limited in configuration to the embodiments that have been described heretofore but may take any shape, provided the lubricant can be held therein.

Figure 8:
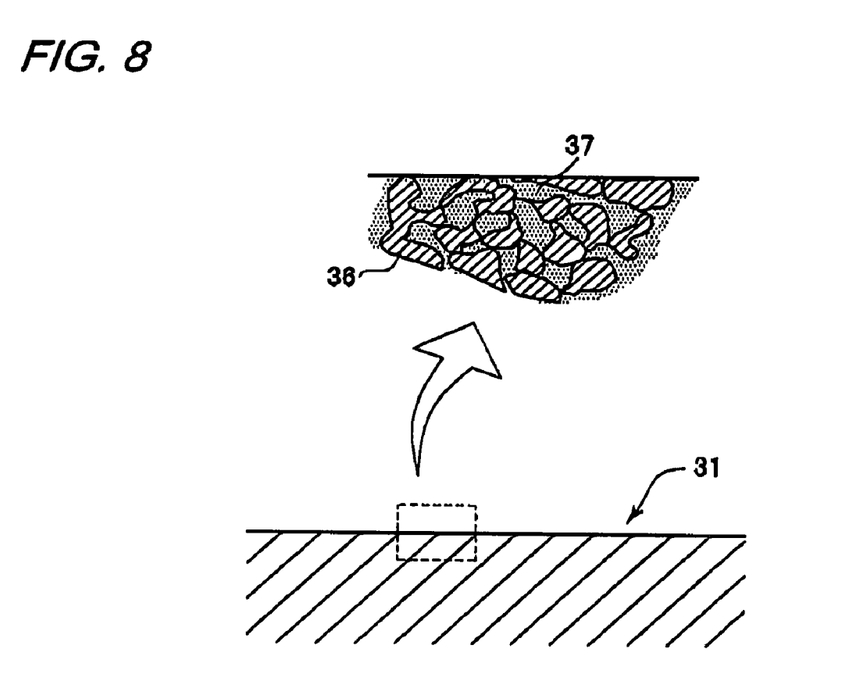
FIG. 8 is an enlarged view which explains Embodiment 5 of a lubricating ring member.

Furthermore, a further embodiment of a lubricating ring member 31 will be illustrated. FIG. 8 shows exemplarily a sectional structure of the lubricating ring member 31. As is shown in FIG. 8, the lubricating ring member 31 can be configured as a porous sintered metal ring formed of a porous member 36 which is impregnated with a liquid lubricant 37 which is held in voids thereof. As the material of the porous member 36, for example, a porous sintered metal is used which is formed by sintering wire materials of stainless steel or various types of alloys. Alternatively, a material may be used which is formed by superposing pieces of stainless steel mesh one on another in multiple layers and sintering them. Further, a material may be used which is formed by sintering metallic powders, in forms of lumps, a spherical shapes or any other irregular shapes, of bronze, aluminum alloy, iron or the like which has superior friction and wear properties. Then, the liquid lubricant 37 is made to be held in an interior and on a surface of the porous member 36, thereby making it possible to prevent the generation of an abnormal noise between the contact surfaces of the inner ring 21 and the hub receiving surface 10d of the axle 10.

Figure 9:
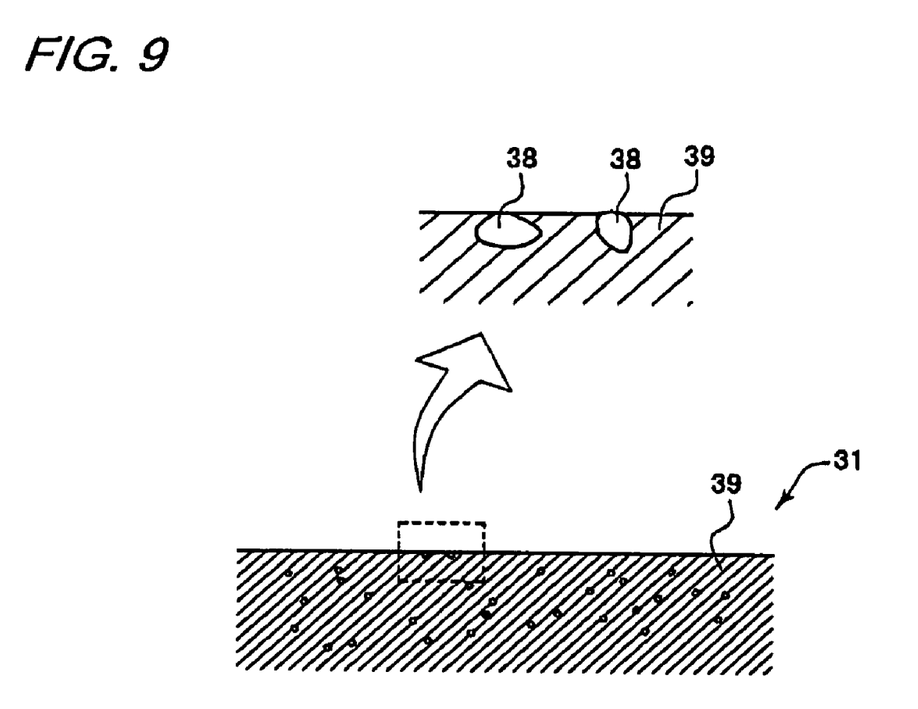
FIG. 9 is an enlarged view which explains Embodiment 6 of a lubricating ring member.

As is shown in FIG. 9, the lubricating ring member 31 may be configured as a composite metal sintered compact in which solid lubricating particles 38 are dispersed in such a manner as to be exposed from the lubricant holding surface. The composite metal sintered compact is such that nitride such as boron nitride, sulfide such as molybdenum disulfide and tungsten disulfide, fluorine compound such as fluorocarbon resin, graphite fluoride and calcium fluoride, laminar structure such as graphite and talc, or soft metal such as Pb, Ag and Cu or a compound thereof is mixed as the solid lubricant particle 38 into a metal 39 which constitutes a body material, the mixture being sintered. By configuring the lubricating ring member 31 in this way, the lubricant can be made to be held on at least either of an abutment surface of the lubricating ring member 31 with the hub receiving surface 10d and an abutment surface thereof with the vehicle inner side end face 21a of the inner ring 21, thereby making it possible to prevent the generation of an abnormal noise between the contact surfaces of the inner ring 21 and the hub receiving surface 10d of the axle 10.

Thus, by fixing the hub unit 1 to the vehicle body in such a state that the lubricating ring member 31 is held between the hub receiving surface 10d which constitutes the step portion of the large-diameter portion 10c and the vehicle inner side end face 21a of the inner ring 21 with at least either of the abutment surface of the lubricating ring member 31 with the hub receiving surface 10d and the abutment surface thereof with the vehicle inner end face 21a of the inner ring made to constitute the lubricant holding surface which holds the lubricant, the hub receiving surface 10d and the vehicle inner side end face 21a of the inner ring 21 are made to easily slip relative to each other, thereby making it possible to prevent the generation of an abnormal noise between the contact surfaces of the inner ring 21 and the hub receiving surface 10d of the axle 10.

What is claimed is:

1. A mounting structure of mounting a hub unit on an axle of a vehicle, comprising:
   the axle including:
      a hub mounting portion formed at an axially distal end portion thereof, and
      a large-diameter portion continuous to the hub mounting portion through a step portion therebetween having a larger outside diameter than an outside diameter of the hub mounting portion; and
   the hub unit mounted on the hub mounting portion of the axle, including:
      an outer ring which is stationarily mounted on a vehicle body,
      a hub wheel having a shaft hole disposed concentrically with the outer ring and attached to a wheel so as to rotate together with the wheel,
      an inner ring which is securely fitted around at least a vehicle inner side end portion of the hub wheel, and
      a plurality of rows of rolling elements interposed between the inner ring fitted around the hub wheel and the outer ring,
   wherein the hub mounting portion of the axle is inserted into the shaft hole in the hub wheel from a vehicle inner side so that the hub unit is fixed to the vehicle body,
   wherein a lubricating ring member is held between a hub receiving surface on the step portion of the axle and a vehicle inner side end face of the inner ring, and
   the lubricating ring member includes a lubricant holding surface which holds a lubricant on at least one of an abutment surface thereof to the hub receiving surface and an abutment surface thereof to the vehicle inner end face of the inner ring.

2. A hub unit mounting structure according to claim 1, wherein the lubricating ring member is formed into a disk which has a through hole at a center thereof and is fixed by being held between the vehicle inner end face of the inner ring and the hub receiving surface of the axle with the axle put through the through hole.

3. A hub unit mounting structure according to claim 1, wherein the lubricating ring member has a depression formed on at least one end face in a radial direction thereof in such a manner as to be depressed from the end face as the lubricant holding surface.

4. A hub unit mounting structure according to claim 3, wherein the depression is formed into a spherical shape.

5. A hub unit mounting structure according to claim 1, wherein the lubricating ring member is a porous sintered metal ring which is impregnated with a liquid lubricant which is held in voids thereof.

6. A hub unit mounting structure according to claim 1, wherein the lubricating ring member is a composite metal sintered compact in which solid lubricating particles are dispersed in such a manner as to be exposed from the lubricant holding surface.

* * * * *